United States Patent [19]

McDougal

[11] Patent Number: 4,489,924
[45] Date of Patent: Dec. 25, 1984

[54] HYDRAULICALLY ACTUATED CLAMPING TABLE ASSEMBLY

[76] Inventor: Thomas F. McDougal, 1415 Beech La., Fairmont, W. Va. 26554

[21] Appl. No.: 504,224

[22] Filed: Jun. 14, 1983

[51] Int. Cl.³ .............................................. B23Q 3/08
[52] U.S. Cl. ........................................ 269/23; 269/32; 269/35; 269/285; 308/3 A
[58] Field of Search ........................ 269/20, 25, 27, 32, 269/23, 35, 172, 285, 900; 308/3 A; 60/404, 413, 586

[56] References Cited

U.S. PATENT DOCUMENTS

| | | | |
|---|---|---|---|
| 2,618,243 | 11/1952 | Treganowan | 60/404 |
| 2,683,386 | 7/1954 | Doebeli | 269/32 |
| 3,953,086 | 4/1976 | Chaffin | 308/3 A |
| 4,101,119 | 7/1978 | Speiser et al. | 308/3 A |
| 4,251,065 | 2/1981 | McDougal | 269/25 |

Primary Examiner—Robert C. Watson
Attorney, Agent, or Firm—Mason, Fenwick & Lawrence

[57] ABSTRACT

A quick-set hydraulic work holding clamping table assembly including an elongated stationary rigid base member having a front control portion, a pair of stationary transversely spaced flat lateral platen sections flanking an elongated dovetail slide channel, an elongated slide plate member shaped to slidably interfit in the slide channel having its top surface lying in the same common plane as the top surface of the lateral platen sections and forming a movable center platen section. The slide plate member is moved forwardly and rearwardly by a manually operable drive screw coupled to the slide plate member and hydraulic power means are connected to the drive screw for rapidly moving the slide plate member relative to the lateral platen sections to move workpiece engaging jaw pieces to the gripping position responsive to application of fluid pressure to the power means.

15 Claims, 7 Drawing Figures

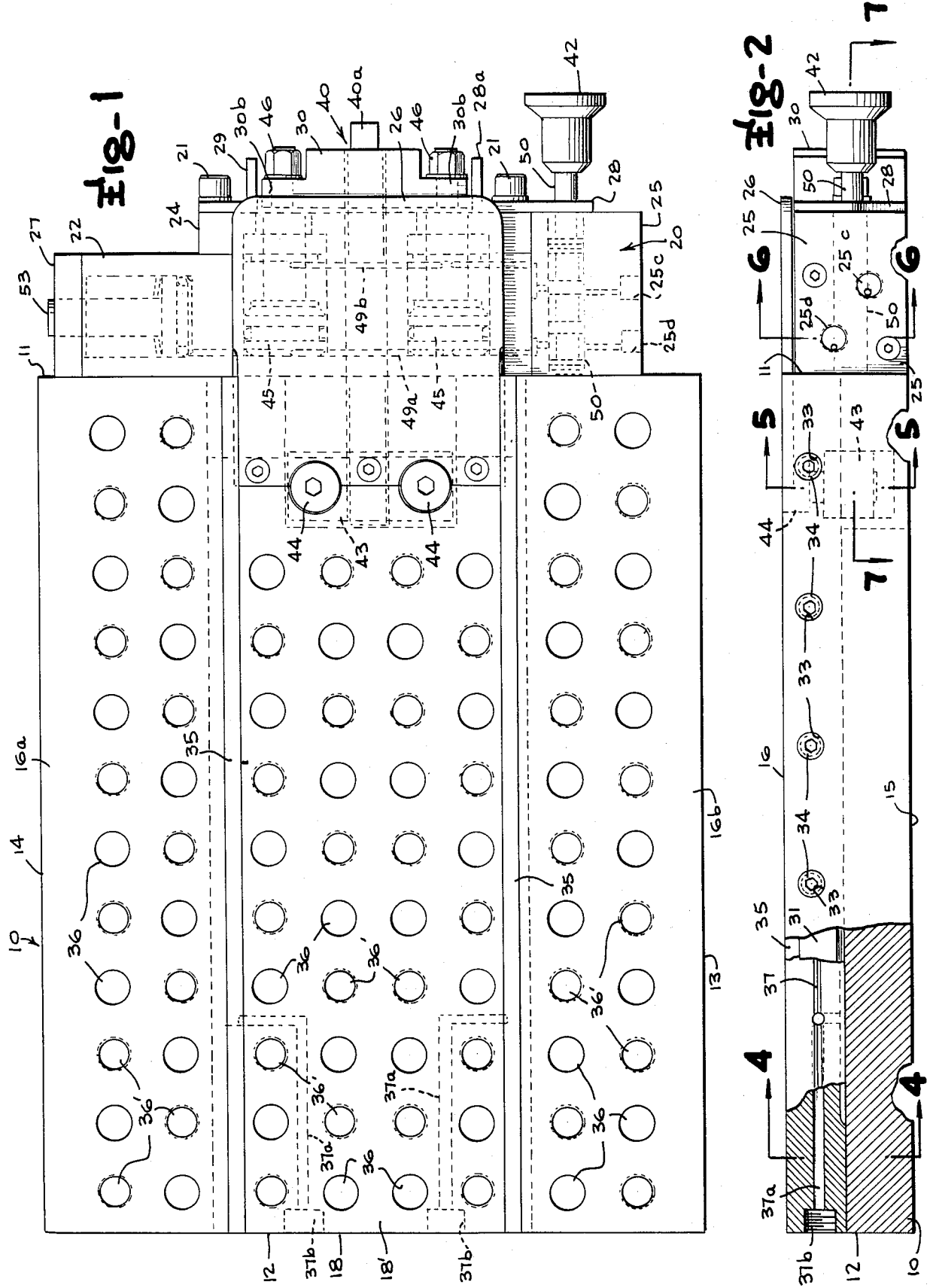

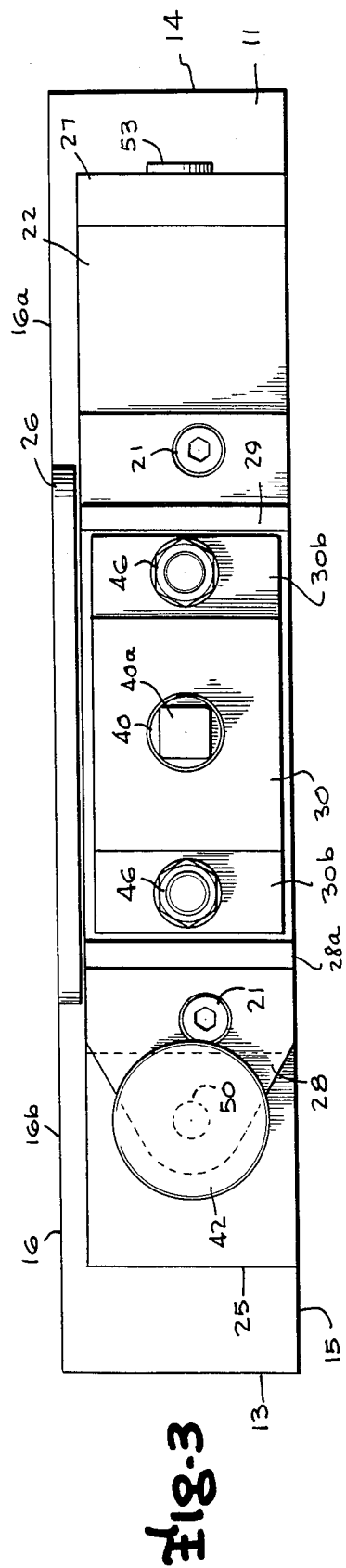
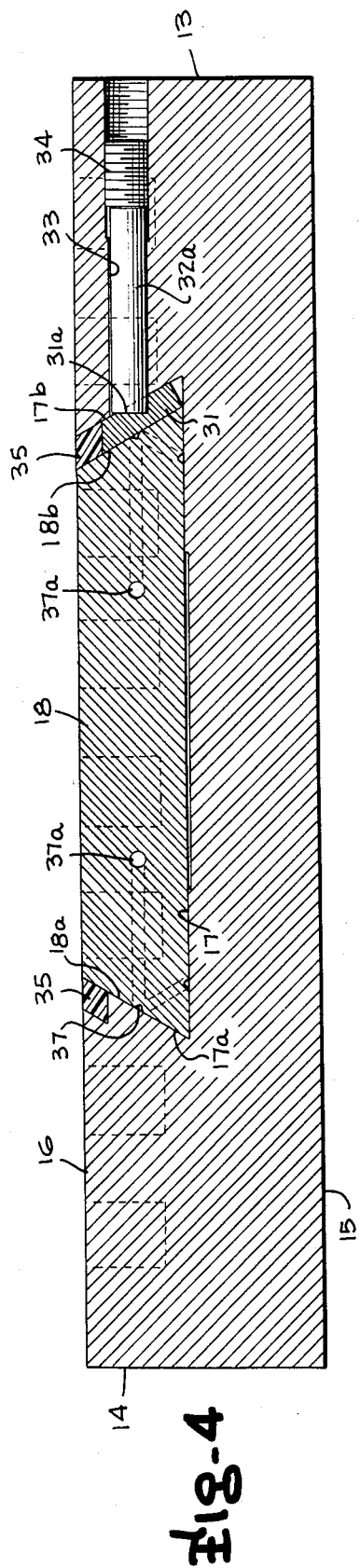
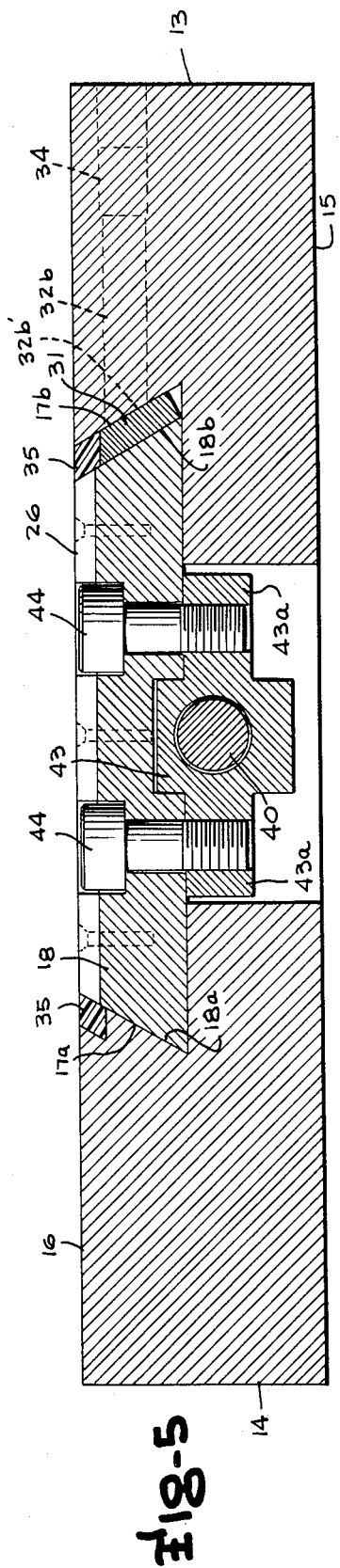

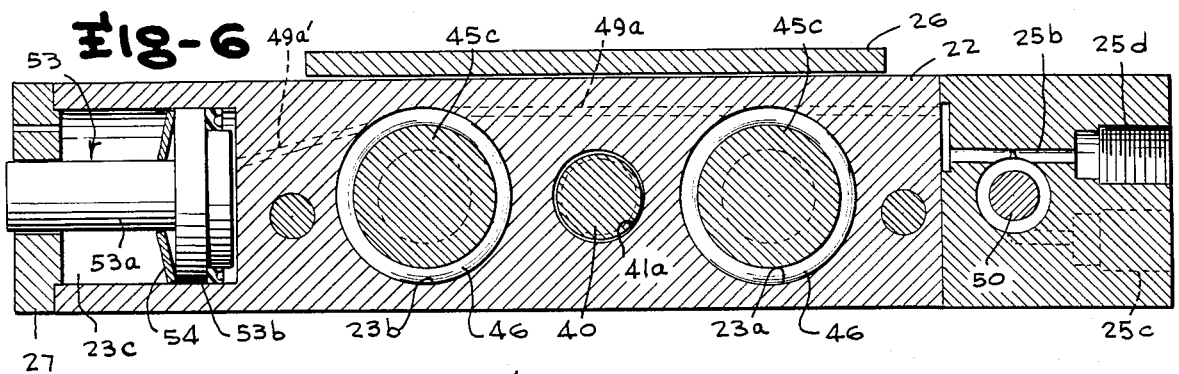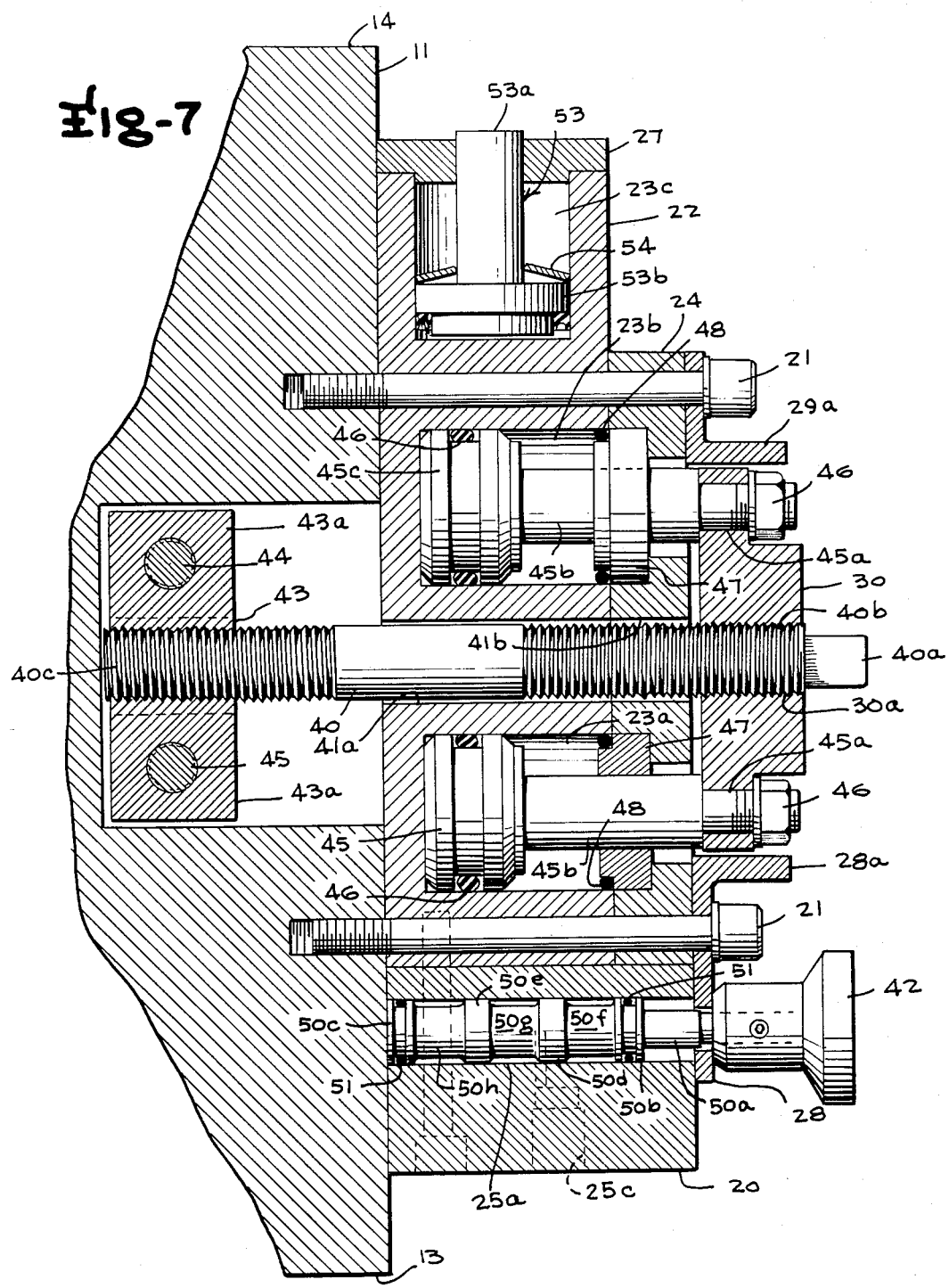

HYDRAULICALLY ACTUATED CLAMPING TABLE ASSEMBLY

BACKGROUND AND OBJECTS OF THE INVENTION

The present invention relates in general to a plural section clamping table assembly for securing workpieces on a metal working machine, and more particularly to a clamping table assembly having plural platen sections provided with patterns of tapped holes and reamed holes adapted to have securing bars or blocks fixed thereto and to be quick set by hydraulic actuating means to provide any size vise up to the maximum size of the table for securing regular and irregular shaped workpieces in a desired position on a metal working machine.

Heretofore, many types of removable workpiece supporting vise or fixture assemblies have been provided to provide a predetermined workpiece positioning assembly on a metal working machine. One of the traditional problems in such workpiece positioning assemblies has been the considerable amount of so-called "set-up" time to properly position the workpiece prior to each forming operation. This problem has been particularly acute where it is desired to provide the workpiece supporting assembly with sufficient flexibility to permit it to secure in proper position irregular shaped workpieces as well as regular shaped workpieces such as cubes, rectangular solids or cylinders. Also, such workpiece positioning tables or assemblies have frequently been quite limited in the variety of sizes of workpieces which can be accommodated.

An object of the present invention, therefore, is the provision of a novel multiple platen section or clamping table section quick set hydraulic clamping table assembly for securing workpieces on a metal working machine or the like, having drilled and threaded platen or clamping table sections arranged to be hydraulically moved relative to each other, each having a large rectangular area providing a wide variety of positions for mounting abutment bars or blocks thereon to form a workpiece holding vise accomodating workpieces up to the maximum size of the table.

Another object of the present invention is the provision of multiple platen or clamping table sections in a hydraulically actuated clamping table assembly of the type described in the preceding paragraph, wherein the securing bars or blocks may be secured in such positions that irregular shaped workpieces may be easily secured thereon.

Yet another object of the present invention is the provision of a novel multiple platen section clamping table assembly as described in any of the preceding paragraphs, having means for locking the platen sections in position to enable the clamping table to be used as an ordinary grid plate.

The clamping table assembly generally comprises a pair of drilled and threaded transversely spaced, flanking or lateral platen or clamping table sections forming a base member, and a drilled and threaded elongated center slide platen or clamping table section. Each platen section is tapped to receive mounting screws for supporting upright abutment bars or blocks to engage the periphery of the workpiece and secure it on the clamping table. The movable center platen section forms a slide for movement toward and away from the stationary lateral flanking sections. Hydraulic drive means are provided, arranged so that when hydraulic pressure is applied to one port, the center slide platen will be moved in one direction and when pressure is applied at another port it will move in another direction. In practice, a workpiece to be supported on the clamping table is placed on the platen sections so that it overlaps each one of the sections. The abutment bars or blocks forming jaw pieces are secured to each platen section, using shims with the jaw pieces or blocks in open position interposed between the jaw pieces and the workpiece to provide clearance when the jaw pieces are open. When the shims are removed the workpiece is then clamped by application of hydraulic pressure by a suitable manually operated valve to the appropriate port to move the center slide platen to effect quick clamping of the workpiece in proper position.

Other objects, advantages and capabilities of the invention will become apparent from the following detailed description, taken in conjunction with the accompanying drawings illustrating a preferred embodiment of the invention.

BRIEF DESCRIPTION OF THE FIGURES

FIG. 1 is a top plan view of a plural platen section clamping table assembly embodying the present invention;

FIG. 2 is a right side elevation view thereof, with parts broken away;

FIG. 3 is a front elevational view thereof;

FIGS. 4, 5 and 6 are vertical transverse section views taken along the section planes indicated by lines 4—4, 5—5, 6—6, of FIG. 2; and FIG. 7 is a fragmentary horizontal section view taken along line 7—7 of FIG. 2.

DETAILED DESCRIPTION OF A PREFERRED EMBODIMENT

Referring to the drawings, wherein like reference characters designate corresponding parts throughout the several figures, the quick set hydraulically actuated clamping table of the present invention comprises an elongated base member of generally rectangular profile in top plan, indicated by the reference character 10, having front and rear end walls 11, 12, side walls 13, 14, a flat bottom surface 15, and a top wall or surface 16 interrupted by a wide, elongated fore and aft extending dovetail recess 17. The dovetail recess, as will be apparent from FIGS. 1 and 4 especially, is of substantially isosceles trapezoidal cross-sectional configuration with the inclined sides 17a, 17b thereof arranged in upwardly converging planes which extend parallel to the fore and aft longitudinal center axis of the base member 10. The two transversely spaced, elongated sections of the top wall or surface 16, herein indicated as 16a and 16b longitudinally span the full fore and aft distance between the front and rear walls 11 and 12 and form flat upwardly facing platen or clamping table sections laterally flanking the dovetail recess 17 lying in a common horizontal plane. An elongated slide block 18 forming a movable center platen or clamping table section 18 is supported for sliding movement in the dovetail recess 17, and for this purpose its dovetail cross-section is of appropriate width and shape to slideably interfit in the dovetail recess 17 providing a space between the inclined side wall surface 18b thereof and the surface 17b of the dovetail recess 17 while the inclined side surface 18a of the dovetail slide block 18 slidably engages and tracks against the surface 17a of the dovetail recess 17.

A control block assembly indicated generally at 20 is fixed at the front of the base member 10 and tightly secured against the front wall 11 thereof, as by threaded bolts 21 having enlarged heads with hexagonal sockets for Allen wrenches or similar driving tools and having threaded shanks extending through holes in the block members making up the control block assembly and extending into tapped openings in the base member 10. The control block 20 includes a cylinder block member 22 having cylindrical cavities 23a, 23b and 23c therein and interconnecting passages as later described, as well as a cylinder head member 24, a valve body 25, a cover plate 26 and a cap 27 for the accumulator cylinder cavity 23c later described. A bracket 28 and guard member 29, as well as a cross-head member 30 also form part of the control block assembly.

Along one side of the dovetail slide 17 is a gib or wear member 31 having a cylindrical socket formation 31a at the appropriate location along its length to receive the end of a true cylindrical spacer member 32a of a group of spacer rods 32 interfitted in a conforming spacer aperture 33, six of which are provided substantially uniformly spaced along the fore and aft length of the base 10 and opening through one side wall thereof, for example the side wall 13. The other five spacer apertures 33 receive five spacers 32b, each of which are provided with an inclined inner end face 32b' corresponding to the inclination of the confronting face of the gib or wear member 31 to bear thereagainst. Each of the spacers 32a, 32b are positioned within their apertures by threaded spacer set screws 34 threaded into threaded portions of the apertures 33 immediately adjacent the side wall 13 and having hexagonal sockets in the accessible ends of the set screws 34 for Allen wrenches or similar driving tools.

At the uppermost portions of the inclined slot 17a and overlying gib or wear member 31 are elongated recesses to accomodate seal strips 35, such as urethane seal strips, to minimize contamination of the confronting surfaces of the dovetail platen section 18' and the dovetail recess 17 of the base member 10 and gib 31.

As will be apparent from FIGS. 1 and 4, the two stationary laterally flanking platen or clamping table sections 16a and 16b and the longitudinally movable elongated platen section 18' formed by the slide 18 are each provided with a large number of drilled holes 36 some of which, as indicated at 36', are tapped holes, for variably positioning and anchoring jaw pieces or abutment pieces of conventional configuration on each platen section at proper location to engage workpieces of a wide variety of different configurations and securely and precisely position them on the clamping table. The jaw pieces or abutment pieces are secured to the respective platen sections in the usual manner by anchoring bolts extending through the jaw pieces and into the tapped openings 36' in the platen sections. The proper locations for the jaw pieces relative to the workpiece may be determined, for example, by using shims between the jaw pieces and the workpiece to provide clearance when the jaw pieces are in relatively open or released position, so that when the shims are removed, the workpiece can then be clamped by applying hydraulic pressure to the hydraulic system for driving the platen section 18a formed by the slide 18, as later described. Generally speaking, hydraulic pressure is applied by a suitable manually operated valve assembly which activates hydraulic piston assemblies to shift the center platen section 18' relative to the stationary laterally flanking platen sections 16a, 16b so as to bring the jaw pieces anchored on the respective platen sections into tight holding contact with the workpiece. Release of the workpiece from clamped relation by the jaw pieces is similarly accomplished by positioning the manually operated valve assembly to return the center platen section 18' to release position withdrawing the jaw pieces from tight holding contact with the workpiece.

To facilitate reciprocative movement of the center platen section 18', the dovetail slide member 18 is provided with a pair of elongated grease grooves 37 in the inclined side faces 18a, 18b thereof, communicating by grease conduits 37a drilled internally in the slide member 18 and terminating in enlarged port or cavity portions 37b at the rearmost end of the slide member 18 for receiving conventional grease fittings.

The longitudinally movable center platen section 18' formed by the slide member 18 is capable of rough adjustment by manual operation of the slide adjusting screw 40. The slide adjusting screw 40 extends in parallelism with the fore and aft center axis of the slide member 18 through aligned bores 41a and 41b in the cylinder block 22 and cylinder head 24, and includes a non-round forwardmost end portion 40a, here shown to be of rectangular cross section, projecting forwardly from a cross head member 30 disposed immediately forwardly of the cylinder head member 24 to receive and be manipulated by a suitable screw driving tool. The center platen section drive screw 40 also includes a left hand threaded section 40b near the front end thereof threaded into a tapped opening 30a in the cross head 30 and also includes a right hand threaded section 40c along the rearmost portion thereof threaded into a nut member 43 which is of somewhat cross-shaped configuration in front or rear elevation providing apertured wing formations 43a to receive shank portions of anchor bolt 44 whose upper portions are received in suitably shaped bolt receiving apertures extending vertically through the forwardmost portion of the slide member 18.

Forward and rearward sliding movement is imparted to the slide member 18 forming the center platen section 18' by a quick acting hydraulic drive mechanism provided in the internal cylinder forming cavities, hydraulic conduit passages and ports formed in the cylinder block 22 and cylinder head member 24, which are controlled from a valve operating knob 42 projecting forwardly from the front face of the valve body member 25 and bracket 28. The hydraulic force applying mechanism for the quick set hydraulic movement of the center platen section 18' includes the slide member operating screw 40 coupled to the slide member 18 by the nut member 43 and coupled at its forward end to the cross-head member 30, having two opposite side or wing portions 30b in which forward portions 45a of piston members 45 having threads at their forward most ends are fixed by nuts 46. The nuts 21 fix the bracket 28 and guard 29 against the front face of the cylinder head 24, with the forwardly projecting guard flanges 28a, 29a adjacent and laterally flanking the nuts 46 and their associated ends of the cross-head member 30 to guard against entry of foreign objects in the space between the latter and the cylinder head 24 when the cross-head member is spaced forwardly from the cylinder head 24.

The piston members 45 include larger diameter intermediate shank portions 45b and enlarged piston head formations 45c at their rearmost ends provided with grooves receiving O-rings 46 therein to bear against the walls of the cylinders 23a, 23b in the cylinder head member 22. At the forwardmost end of each cylinder cavity 23a, 23b is an annular cylindrical bushing 47 having a center opening through which the shank portion 45b of the associated piston member 45 slides axially and also having an annular recess formation accomodating an O-ring 48 to seal against the surface of the associated cylinder cavity 23a, 23b. Transverse hydraulic fluid conduits or passages 49a, 49b extend transversely between the cylinder cavities 23a and 23b opening into the cylinder cavities rearwardly of and forwardly of the locations of the piston head formation 45c and communicating with associated hydraulic fluid passages in the valve body member 25 which houses the valve spool 50 fixed at its forwardmost end to the valve operating knob 42. The rearmost set of hydraulic fluid passages or conduits 49a also include a portion 49a' communicating the rearmost end portion of cylinder cavity 49b with the accumulator cylinder cavity 23c as shown in FIG. 6.

The valve spool 50 moves axially in the bore 25a extending from front to rear through the valve body member 25 and includes a shank portion 50a having a pair of front and rear enlarged diameter sealing head formations 50b, 50c having circumferential recesses to receive sealing O-rings 51 and a pair of enlarged diameter cylindrical valve heads 50d and 50e separated by relieved circumferential channel formations 50f, 50g and 50h. Channels 50f, 50g and 50h are positioned relative to the hydraulic fluid conduits or passages 25b formed internally in the valve block 25 and opening at selected axial positions along the bore 25a to direct pressurized hydraulic fluid from the pressure port 25c and return port 25d at the exposed side of the valve body 25 to the appropriate conduits or passages of the cylinder block 22 to drive the piston members 45 either forwardly or rearwardly depending upon the axial position of the valve spool 50 and knob 42.

The accumulator cylinder cavity 23c houses an accumulator piston 53 having a reduced diameter shaft portion 53a and an enlarged cylindrical piston head formation 53b, together with an associated annular, truncated conical disc spring 54, or a plurality of such disc springs, encircling the smaller diameter shank portion 53a adjacent the cylinder head formation 53b. Because of this accumulator piston, disc spring and accumulator cylinder arrangement, any momentary failure of the hydraulic system while the hydraulic system is adjusted to maintain the center platen section slide member 18 in work clamping position will not release the work, as the hydraulic accumulator effect of the piston 53 and cylinder 23c, in conjunction with a conventional check valve (not shown) provided in the pressure port 25c, provides the safety feature of holding the work firmly gripped in the event of such momentary failure. Also, the outwardly directed convergence of the annular disc spring 54 exerts an inwardly directed resilient bias on the piston head formation 53b of the accumulator piston head formation 53b of the accumulator piston 53 as the accumulator system disc spring 54 is stressed to a more planiform configuration when full hydraulic clamping pressure exists, so that slight leakage of hydraulic fluid would not result in immediate loss of all clamping pressure as the disc spring 54 would absorb the slight movement caused by such loss and tend to maintain appropriate clamping pressure on the drive pistons 45.

In the operation of the slide table assembly, assuming the center slide platen section 18' to be in a normal position aligned with the lateral flanking sections 16a, 16b as shown in FIG. 1, the jaw pieces or abutment pieces (not shown) are arranged along the platen surfaces to almost abut the adjacent confronting surface portions of the workpiece, with shims interposed between the jaw pieces and the confronting workpiece surfaces, as previously described, and the jaw pieces are fixed in position by the anchoring bolts conventionally associated with them threaded into the tapped openings 36' in the platen sections. Rough adjustment of the center platen section 18' relative to the stationary laterally flanking sections 16a, 16b can be achieved as desired by rotation of the slide platen drive screw 40, by applying a conventional operating tool to the square or non-round forward end 40a thereof. Upon Adjustment of the valve control knob 42 to the desired axial position to hydraulically drive the center slide section 18' to the clamping position, hydraulic fluid from a conventional pressurized source coupled to the pressure port 25c is applied to the rear faces of the piston head formations 45c of the piston members 45, for example, through the passages 49a of the cylinder block 22, driving the two piston members 45 forwardly through their clamping stroke and carrying with them the cross-head member 30 and the screw member 40 linked by the nut member 43 and anchor bolts 44 to the slide platen 18'. When the piston head formations 45c occupy their forwardmost limit positions in the clamping position of the apparatus, the hydraulic fluid pressure also applied through the passage 49a' of the cylinder block 22 to the accumulator cylinder cavity 23c drives the accumulator piston 53 to its outer limit position, stressing the accumulator disk spring 54 to a distorted condition storing energy which serves to maintain clamping pressure in the hydraulic system in the event of slight leakage of hydraulic fluid to avoid immediate loss of all clamping pressure, as previously described. To effect retraction of the center slide platen 18' to the release position, the valve control knob 42 is axially adjusted to the release position communicating the pressure port 25c with the space in the cylinder cavities 23a forwardly of the piston head formations 45c, for example through the passages 49b, causing the piston members 45 to be quickly moved rearwardly through their return or release stroke, which motion is transferred to the slide platen 18' through the cross-head member 30, screw 40, and nut member 43.

I claim:
1. A quick-set hydraulic work holding clamping table assembly, comprising an elongated stationary rigid base member having a fore-and-aft longitudinal center axis and an upwardly facing top surface to be disposed in a common horizontal plane and including a front control portion at the front end of said base member and an elongated, upwardly opening dovetail cross-section slide channel opening though said top surface and extending from said front control portion to the rear end of the base member, the portions of said top surface laterally flanking said slide channel forming a pair of transversely spaced flat lateral platen sections, an elongated slide plate member having a dovetail cross-section shaped and sized to slidably interfit in said slide channel and extending substantially the length thereof having its top surface lying in the same common plane as the top surface of the said lateral platen sections and forming a movable center platen section, said platen sections each having upwardly opening apertures therein some of which are threaded for variably fixing jaw pieces thereon for holding workpieces of various shapes on the top surfaces of the platen sections, means supporting said slide plate member for longitudinal movement forwardly and rearwardly of the base member including a manually operable drive screw coupled to said slide plate member and having drive screw support means connected thereto and to control means in said control portion for movement of the drive screw and slide plate member forwardly and rearwardly between a work gripping position and a work release position, said control means in said control portion including hydraulic power means connected to said drive screw support means for rapidly moving said slide plate member forming the center platen section relative to said lateral platen sections to move the workpiece engaging jaw pieces to said gripping position responsive to application of fluid pressure to said power means including a manually adjustable control valve in said control means, and said control valve and control means including means for returning said slide plate member forming the center platen section to a release position relative to the lateral stationary platen sections.

2. A quick set hydraulic work holding clamping table assembly as defined in claim 1, wherein said drive screw is coupled to said slide plate member and to said drive screw support means by means including a threaded connection causing axial movement of the drive screw and the slide plate member relative to said stationary base member upon manual rotation of the drive screw for coarse adjustment of the position of the slide plate member relative to the flanking lateral platen sections.

3. A quick set hydraulic work holding clamping table assembly as defined in claim 1, wherein said drive screw support means is a cross-head member extending laterally in opposite directions from said drive screw at the front of said control portion and said hydraulic power means comprises a pair of piston members supported for movement in cylinders in said control portion of the base member along axes paralleling said longitudinal axis, said control valve forming means for applying fluid pressure force to said piston members in a first direction for moving the cross-head member and slide plate member connected by the drive screw therewith forwardly relative to the stationary lateral platen sections of said top surface to move the platen sections to workpiece gripping position and being adjustable to a return position for applying fluid pressure force to said piston members to drive the piston members and cross-head member rearwardly for returning the slide plate member to workpiece release position.

4. A quick set hydraulic work holding clamping table assembly as defined in claim 2, wherein said drive screw support means is a cross-head member extending laterally in opposite directions from said drive screw at the front of said control portion and said hydraulic power means comprises a pair of piston members supported for movement in cylinders in said control portion of the base member along axes paralleling said longitudinal axis, said control valve forming means for applying fluid pressure force to said piston members in a first direction for moving the cross-head member and slide plate member connected by the drive screw therewith forwardly relative to the stationary lateral platen sections of said top surface to move the platen sections to workpiece gripping position and being adjustable to a return position for applying fluid pressure force to said piston members to drive the piston members and cross-head member rearwardly for returning the slide plate member to workpiece release position.

5. A quick set hydraulic work holding clamping table assembly as defined in claim 1, wherein said base member includes an elongated wear strip interposed between a side of said dovetail slide member and a confronting side of said dovetail channel, and a plurality of set screw means threaded in said base member having means bearing against said wear strip at longitudinally spaced positions therealong for adjustment of the latter relative to the side of said dovetail slide member adjacent said confronting side of the dovetail recess.

6. A quick set hydraulic work holding clamping table assembly as defined in claim 2, wherein said base member includes an elongated wear strip interposed between a side of said dovetail slide member and a confronting side of said dovetail channel, and a plurality of set screw means threaded in said base member having means bearing against said wear strip at longitudinally spaced positions therealong for adjustment of the latter relative to the side of said dovetail slide member adjacent said confronting side of the dovetail recess.

7. A quick set hydraulic work holding clamping table assembly as defined in claim 3, wherein said base member includes an elongated wear strip interposed between a side of said dovetail slide member and a confronting side of said dovetail channel, and a plurality of set screw means threaded in said base member having means bearing against said wear strip at longitudinally spaced positions therealong for adjustment of the latter relative to the side of said dovetail slide member adjacent said confronting side of the dovetail recess.

8. A quick set hydraulic work holding clamping table assembly as defined in claim 4, wherein said base member includes an elongated wear strip interposed between a side of said dovetail slide member and a confronting side of said dovetail channel, and a plurality of set screw means threaded in said base member having means bearing against said wear strip at longitudinally spaced positions therealong for adjustment of the latter relative to the side of said dovetail slide member adjacent said confronting side of the dovetail recess.

9. A quick set hydraulic work holding clamping table assembly as defined in claim 1, wherein said control portion includes an accumulator cylinder and piston communicating through hydraulic fluid passages with the cylinders for said first mentioned piston members for activating the accumulator piston to a displaced position when hydraulic pressure is applied to the first mentioned piston members positioning them in the forward gripping position of the slide member, said accumulator piston having a disk spring thereon and means associated therewith for elastically stressing said disk spring member to a distorted condition when the hydraulic power means disposes the first mentioned piston members in said gripping position providing the effect of a hydraulic accumulator for holding the workpiece firmly gripped by the jaw pieces thereon upon momentary failure or reduction in pressure of the hydraulic system.

10. A quick set hydraulic work holding clamping table assembly as defined in claim 2, wherein said control portion includes an accumulator cylinder and piston communicating through hydraulic fluid passages with the cylinders for said first mentioned piston members for activating the accumulator piston to a displaced position when hydraulic pressure is applied to the first mentioned piston members positioning them in the forward gripping position of the slide member, said accumulator piston having a disk spring thereon and means associated therewith for elastically stressing said disk spring member to a distorted condition when the hydraulic power means disposes the first mentioned piston members in said gripping position providing the effect of a hydraulic accumulator for holding the workpiece firmly gripped by the jaw pieces thereon upon momentary failure or reduction in pressure of the hydraulic system.

11. A quick set hydraulic work holding clamping table assembly as defined in claim 3, wherein said control portion includes an accumulator cylinder and piston communicating through hydraulic fluid passages with the cylinders for said first mentioned piston members for activating the accumulator piston to a displaced position when hydraulic pressure is applied to the first mentioned piston members positioning them in the forward gripping position of the slide member, said accumulator piston having a disk spring thereon and means associated therewith for elastically stressing said disk spring member to a distorted condition when the hydraulic power means disposes the first mentioned piston members in said gripping position providing the effect of a hydraulic accumulator for holding the workpiece firmly gripped by the jaw pieces thereon upon momentary failure or reduction in pressure of the hydraulic system.

12. A quick set hydraulic work holding clamping table assembly as defined in claim 4, wherein said control portion includes an accumulator cylinder and piston communicating through hydraulic fluid passages with the cylinders for said first mentioned piston members for activating the accumulator piston to a displaced position when hydraulic pressure is applied to the first mentioned piston members positioning them in the forward gripping position of the slide member, said accumulator piston having a disk spring thereon and means associated therewith for elastically stressing said disk spring member to a distorted condition when the hydraulic power means disposes the first mentioned piston members in said gripping position providing the effect of a hydraulic accumulator for holding the workpiece firmly gripped by the jaw pieces thereon upon momentary failure or reduction in pressure of the hydraulic system.

13. A quick set hydraulic work holding clamping table assembly as defined in claim 5, wherein said control portion includes an accumulator cylinder and piston communicating through hydraulic fluid passages with the cylinders for said first mentioned piston members for activating the accumulator piston to a displaced position when hydraulic pressure is applied to the first mentioned piston members positioning them in the forward gripping position of the slide member, said accumulator piston having a disk spring thereon and means associated therewith for elastically stressing said disk spring member to a distorted condition when the hydraulic power means disposes the first mentioned piston members in said gripping position providing the effect of a hydraulic accumulator for holding the workpiece firmly gripped by the jaw pieces thereon upon momentary failure or reduction in pressure of the hydraulic system.

14. A quick set hydraulic work holding clamping table assembly as defined in claim 6, wherein said control portion includes an accumulator cylinder and piston communicating through hydraulic fluid passages with the cylinders for said first mentioned piston members for activating the accumulator piston to a displaced position when hydraulic pressure is applied to the first mentioned piston members positioning them in the forward gripping position of the slide member, said accumulator piston having a disk spring thereon and means associated therewith for elastically stressing said disk spring member to a distorted condition when the hydraulic power means disposes the first mentioned piston members in said gripping position providing the effect of a hydraulic accumulator for holding the workpiece firmly gripped by the jaw pieces thereon upon momentary failure or reduction in pressure of the hydraulic system.

15. A quick set hydraulic work holding clamping table assembly as defined in claim 7, wherein said control portion includes an accumulator cylinder and piston communicating through hydraulic fluid passages with the cylinders for said first mentioned piston members for activating the accumulator piston to a displaced position when hydraulic pressure is applied to the first mentioned piston members positioning them in the forward gripping position of the slide member, said accumulator piston having a disk spring thereon and means associated therewith for elastically stressing said disk spring member to a distorted condition when the hydraulic power means disposes the first mentioned piston members in said gripping position providing the effect of a hydraulic accumulator for holding the workpiece firmly gripped by the jaw pieces thereon upon momentary failure or reduction in pressure of the hydraulic system.

* * * * *